Patented June 3, 1924.

1,496,527

UNITED STATES PATENT OFFICE.

HAROLD N. COX, OF GLEN RIDGE, NEW JERSEY, ASSIGNOR TO NEW JERSEY PATENT COMPANY, OF WEST ORANGE, NEW JERSEY, A CORPORATION OF NEW JERSEY.

PRODUCTION OF ELECTRODES FOR GALVANIC BATTERIES.

No Drawing. Original application filed April 12, 1919, Serial No. 289,644. Divided and this application filed December 14, 1920. Serial No. 430,783.

*To all whom it may concern:*

Be it known that I, HAROLD N. Cox, a citizen of the United States, and a resident of Glen Ridge, Essex County, New Jersey, have invented certain new and useful Improvements in the Production of Electrodes for Galvanic Batteries, of which the following is a description.

The present application is a division of my copending application, Serial No. 289,644, filed April 12, 1919, and entitled, Production of electrodes for galvanic batteries on which Patent 1,366,559 was granted on Jan. 25, 1921.

My invention relates to the production of electrodes for galvanic batteries, and more particularly those employing a caustic alkaline electrolyte, and in which the negative electrode consists of an element or elements of oxid of copper or other depolarizing agent and the positive electrode consists of an element or elements of zinc.

In batteries of this type, the negative electrodes are usually made in the form of plates or cylinders molded from a mass of finely divided oxid of copper. As oxid of copper is a material the particles of which have very slight attraction for each other, it has heretofore been necessary in forming such electrodes to subject the finely divided copper oxid to an enormous pressure in molding and to then bake or heat the molded element for a considerable period under a red heat in order to properly agglomerate and harden the same. It has also been customary before molding the finely divided oxid of copper, to mix a slight amount of alkaline water therewith.

The principal object of my invention is to produce an improved electrode of this character which will be more uniform in structure and which will be self-sustaining and sufficiently hard and strong for practical use, without subjecting the same to the usual baking operation.

My invention also resides in the method of making my improved electrode.

I have found that molded oxid of copper electrodes in which a mixture of finely divided metallic iron, or finely divided iron reduced by hydrogen with an electrolyte such, for example, as an ammonium salt, but preferably ammonium chloride, if properly incorporated or combined with the oxid of copper as a binder therefor, are sufficiently hard, strong and coherent without baking. Moreover, the disposition of the oxid of copper in such an electrode is more uniform than in electrodes of this character heretofore employed, and consequently the electrode is more uniform in its action in the cell.

Where finely divided metallic iron or iron reduced by hydrogen is mixed or associated with an ammonium salt or other suitable electrolyte as a binder for the oxid of copper, the electrode produced is harder and stronger than where the binder consists only of an ammonium salt or other suitable electrolyte.

Electrodes embodying my invention may be made by various methods, but I find the following to be the preferred:

Where finely divided iron or iron reduced by hydrogen is combined with an ammonium salt, such as ammonium chloride, or other suitable electrolyte as a binder, the electrode is formed by mixing substantially 100 parts by weight of cupric oxid with substantially 2 parts by weight of finely divided metallic iron or iron reduced by hydrogen, and then with about 5 parts by weight of water. The cupric oxid is preferably of such fineness that it will all pass through a 100 mesh screen and 75% of it will pass through a 200 mesh screen. The mixture is then pressed or molded into an electrode of the desired form in a suitable mold, removed from the mold, and then sprayed with a sufficient amount of a solution of the electrolyte such as an ammonium salt, and preferably ammonium chloride, to make the final electrolyte or ammonium salt content of the electrode when dried about 2% of its weight. The solution sprayed on the molded electrode should be at a temperature of approximately forty degrees Fahrenheit and should be nearly saturated with the ammonium chloride or other electrolyte. After the electrode is sprayed, it is thoroughly dried and is then ready for use in a cell. Electrodes thus produced are substantially uniform in structure or substantially homogeneous throughout.

Iron reduced by hydrogen generally consists of a mixture of finely divided pure iron and an oxid or oxides thereof. Accordingly, the term "iron-containing material" as used in certain of the claims is intended to cover either iron, or an oxide or oxides thereof, or both iron and an oxide or oxides thereof.

It is to be understood that the electrodes specifically described herein, as well as the method for producing the same, are merely illustrative of my invention, and that many modifications and changes may be made therein without departing from the spirit of the invention and the scope of the appended claims.

Having now described my invention, what I claim as new and desire to protect by Letters Patent is as follows:

1. A self-sustaining unbaked electrode element for galvanic batteries consisting of oxid of copper combined with a mixture of finely divided iron and an electrolyte as a binder, substantially as described.

2. A self-sustaining unbaked electrode element for galvanic batteries consisting of oxid of copper combined with a mixture of finely divided iron and an ammonium salt as a binder, substantially as described.

3. A self-sustaining unbaked electrode element for galvanic batteries consisting of oxid of copper combined with a mixture of finely divided iron and ammonium chloride as a binder, substantially as described.

4. A self-sustaining unbaked electrode element for galvanic batteries consisting of oxid of copper and a mixture of finely divided iron-containing material and an electrolyte as a binder, substantially as described.

5. A self-sustaining unbaked electrode element for galvanic batteries consisting of oxid of copper and a mixture of finely divided iron-containing material and an ammonium salt as a binder, substantially as described.

6. A self-sustaining unbaked electrode element for galvanic batteries consisting of oxid of copper and a mixture of finely divided iron-containing material and ammonium chloride as a binder, substantially as described.

7. A self-sustaining electrode element for galvanic batteries, consisting of a mixture of approximately 100 parts of weight of oxid of copper, 2 parts by weight of iron-containing material, and 2 parts by weight of an electrolyte, substantially as described.

8. The method of forming an electrode element for galvanic batteries, which consists in incorporating oxid of copper, finely divided iron-containing material and a solution of an electrolyte in a molded element, and then drying such element, substantially as described.

This specification signed this 11th day of December, 1920.

HAROLD N. COX.